March 10, 1964 G. A. KENDALL ETAL 3,124,043
FLUID MOTOR

Filed Oct. 19, 1960 3 Sheets-Sheet 1

INVENTORS.
GILES A. KENDALL
ROBERT C. LAUTERWASSER
BY
R. E. Geauque
ATTORNEY

March 10, 1964  G. A. KENDALL ETAL  3,124,043
FLUID MOTOR

Filed Oct. 19, 1960  3 Sheets-Sheet 2

INVENTORS.
GILES A. KENDALL
ROBERT C. LAUTERWASSER
BY
R.E. Giauque
ATTORNEY

March 10, 1964     G. A. KENDALL ETAL     3,124,043
FLUID MOTOR
Filed Oct. 19, 1960     3 Sheets-Sheet 3

INVENTORS.
GILES A. KENDALL
ROBERT C. LAUTERWASSER
BY R.E. Geangue
ATTORNEY

United States Patent Office 3,124,043
Patented Mar. 10, 1964

3,124,043
FLUID MOTOR
Giles A. Kendall, Van Nuys, and Robert C. Lauterwasser, Rolling Hills, Calif., assignors to Menasco Manufacturing Company, Burbank, Calif., a corporation of California
Filed Oct. 19, 1960, Ser. No. 63,607
8 Claims. (Cl. 91—178)

This invention relates to a fluid motor and more particularly to a fluid motor which can provide a relative uniform torque through a large angle, such as traversed by the nose steering wheel of an aircraft.

Fluid actuating steering motors presently utilize a single cylinder which operates only on one side of dead center. Thus, the steering torque varies considerably if a large steering angle, such as 150 degrees, is utilized. The present invention utilizes two fluid cylinders having piston rods connected to a single crank arm and the cylinders and crank case are selectively pressurized to obtain the desired torque output curve from the motor. By controlling the pressurization of the cylinders and the crank case, a relative uniform torque can be produced on the crank shaft over a large steering angle (such as 75 degrees to right and left of dead center) and when the pressurization is removed, the wheel connected with the crank shaft can swivel through 360 degrees without being disconnected from the crank shaft. Thus, manual disconnection of the wheel is not necessary when swivel action is desired. The two cylinders are located at an angle to one another and on opposite sides of dead center of the crank shaft. While fluid motors using a plurality of pistons have been utilized as actuators, the crank case of such motors have been either empty or continuously filled with fluid. In the present invention, fluid pressures supplied to the plurality of cylinders and to the crank case are varied to obtain a modified torque output resulting from a combination of the fluid forces.

It is therefore an object of the present invention to provide a fluid motor utilizing a plurality of pistons connected to a single crank shaft; the pistons being selectively subject to pressurization of the crank case to modify the output torque of the crank shaft.

Another object of the present invention is to provide a fluid motor which produces relative uniform torque over a large angle through the combination of the forces of two pistons acting on a single crank shaft and of fluid pressure selectively introduced to the crank case.

Another object of the present invention is to provide a steering motor having a relative uniform steering torque through a large steering angle, such as 150 degrees, while permitting swivel of the steering wheel without disconnection from the motor during towing.

A further object of the present invention is to provide a fluid motor which comprises two pistons angularly positioned with respect to one another and connected to a single crank shaft and having means for selectively pressurizing the cylinders and the crank case to select the torque output of the motor.

These and other objects of the invention not specifically set forth above will become readily apparent from the accompanying description and drawings, in which.

Figure 1:
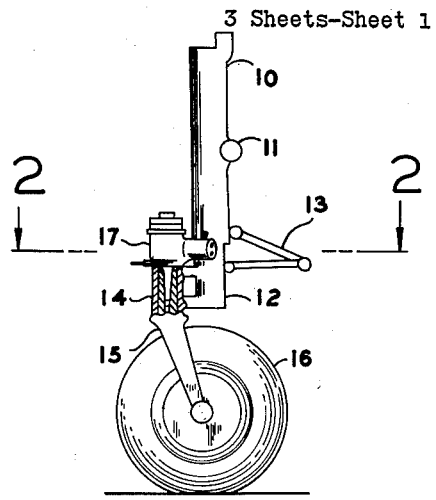
FIGURE 1 is an elevational view of the struts for the nose wheel of an aircraft showing the fluid motor of the present invention mounted thereon for use as a steering motor.

Referring to FIGURE 1, one embodiment of the fluid motor of the present invention is illustrated in connection with the nose wheel assembly of an aircraft. The assembly comprises a cylinder 10 secured by pin 11 to the aircraft structure (not shown) and the cylinder receives a plunger 12 which can move within the cylinder but is prevented from rotation relative thereto by the double linkage 13. The plunger 12 has an opening for receiving end 14 of fork 15 which supports the nose wheel 16. The fluid motor 17 is secured to the plunger 12 by a bracket 18 forming integrally therewith (see FIGURE 2) and the motor has a spindle 19 extending into fork end 14. A splined surface 20 on spindle 19 serves to impart rotation of the spindle to the shaft 14 in order to rotate the wheel 16. The spindle 19 extends through an opening in body portion 21 of crank case 22 and is supported for rotation by sleeve bearing portions 23. A sealing ring 24 is located between the bearing portions to provide a fluid tight connection between body portion 21 and the spindle.

A crank arm 25 is formed integrally with the spindle 19 and is contained within the central body portion of crank case 22. Two cylinders 26 and 27 extend from body portion 21 at approximately 90 degrees to one another and the neutral position of the crank shaft 25 is along centerline 28 which bisects the angle between the cylinder axes. Each cylinder 26, 27 is closed by a cylinder head 29 held against a retaining ring 30 by bolts 31 passing through a cover plate 32. Each cylinder head 29 contains a sealing ring 33 to make it fluid tight with the cylinder. A piston head 34 is contained in each of the cylinders and is made fluid tight by a piston ring 35. A piston pin 36 is contained in opening 37 in each of the piston heads 34 and each pin carries a curved sleeve bearing portion 38 which receives a bearing portion 39 contained in ring 40. The ring 40 in cylinder 26 is connected to piston rod 41 and the ring 40 in cylinder 27 is connected to piston rod 42.

The end of piston rod 41 is split by groove 43 into separate rings 44 and 45 and the piston rod 42 terminates in a single ring 46 which is located in groove 43 between rings 44 and 45. The end 47 of crank arm 25 carries a curved sleeve bearing 48 which is surrounded by a bearing portion 49 fitted within the rings 44, 45 and 46. A retainer ring 50 on end 47 is located at one side of bearing portion 48 and a retainer ring 51 is located at the other side and held in position by a nut 52 locked to reduced end 53 by pin 54. The inner ends of cylinders 26 and 27 are enlarged at position 55 so that the crank arm 25 can rotate through 360 degrees without the piston rods striking the cylinder walls. The reduced end 53 of the crank arm 25 is connected to a lever arm 56 which is supported for rotation by a shaft 57 mounted in a closure plate 58. The plate 58 is held against a retaining ring 59 by means of bolts 60 carried by cover ring 61. The shaft 57 and plate 58 are sealed by sealing rings 62 and 63, respectively.

Figure 2:
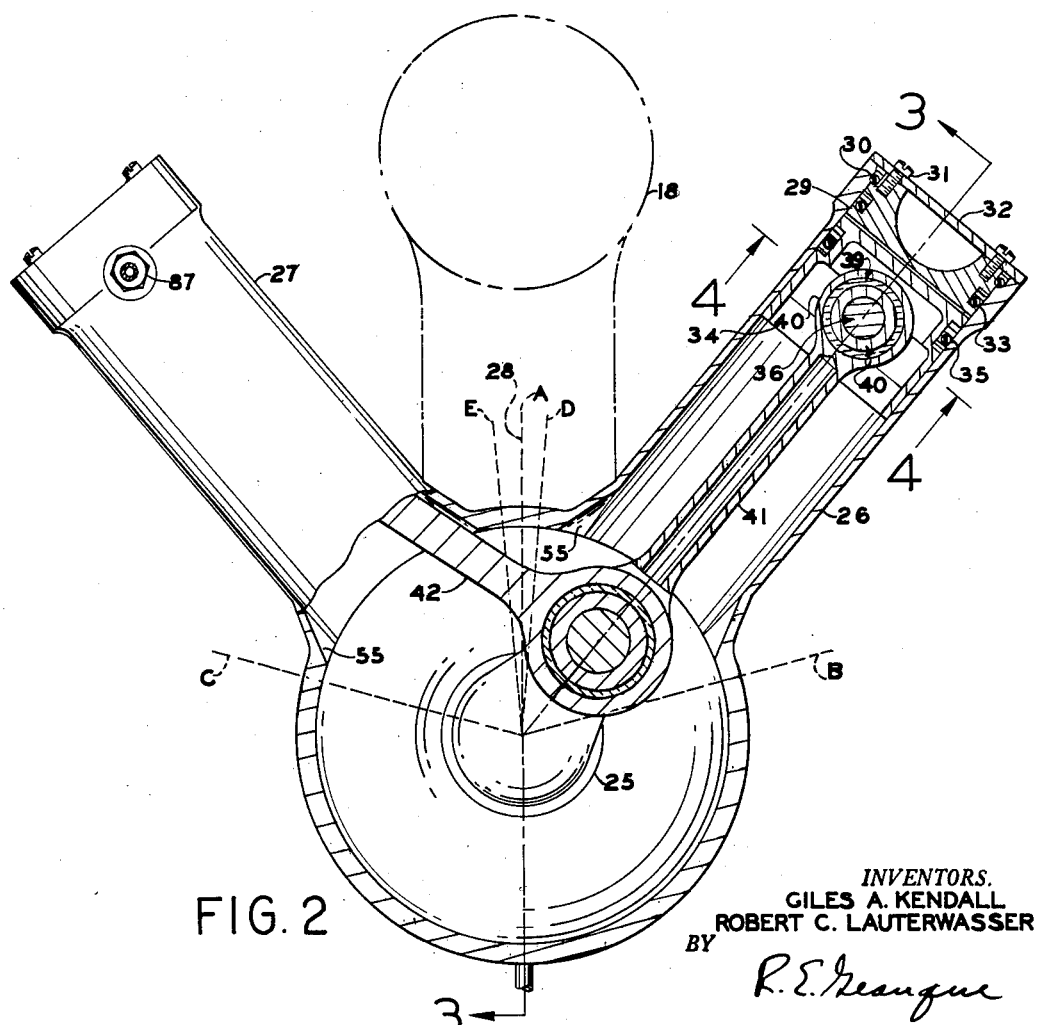
FIGURE 2 is a sectional view, partly in elevation, along line 2—2 of FIGURE 1, illustrating the two cylinders of the fluid motor.
Figure 3:
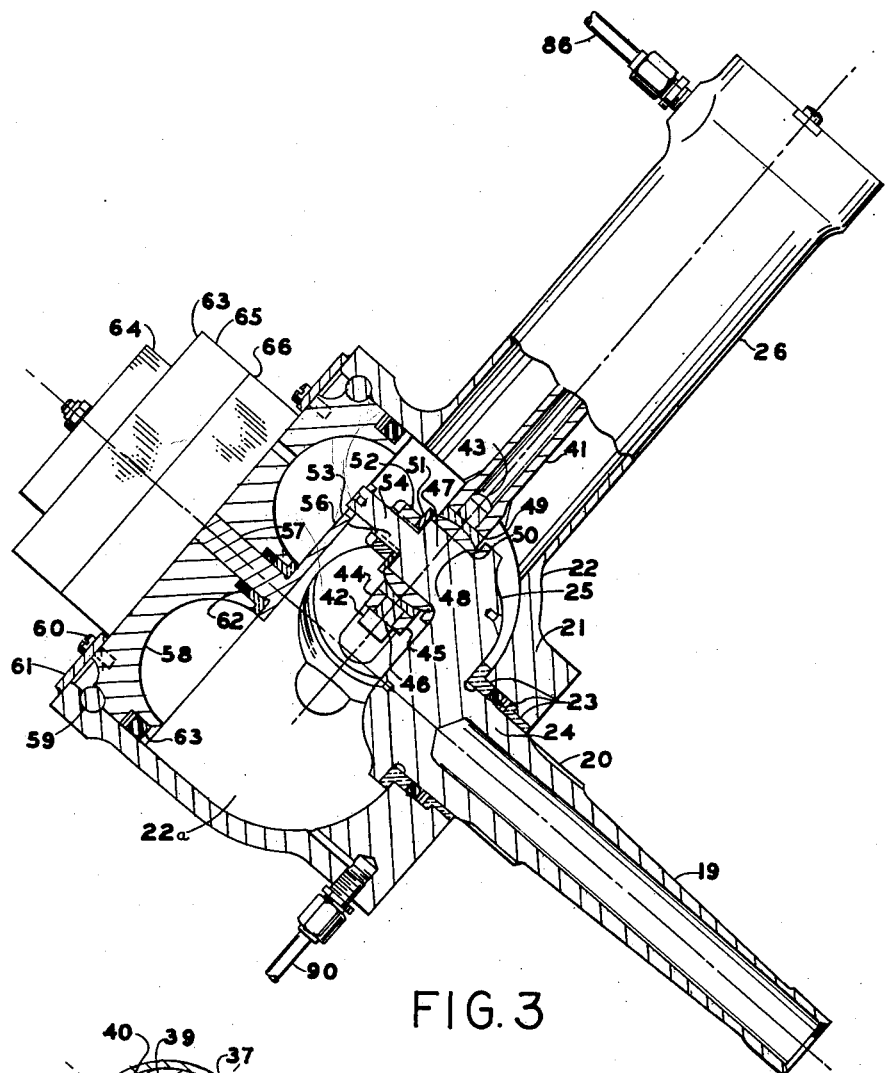
FIGURE 3 is a sectional view, partly in elevation along line 3—3 of FIGURE 2, showing the pistons connected to a common crank shaft.
Figure 4:
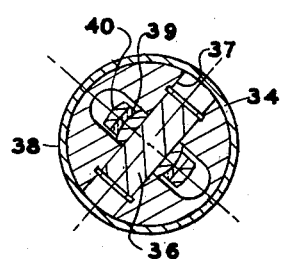
FIGURE 4 is a sectional view along line 4—4 of FIGURE 2, illustrating the connection of one of the piston rods to one of the cylinders.

A housing 63 is secured to the exterior surface of end plate 58 and compartment 64 houses a follow-up potentiometer. A second compartment 65 contains a manually controlled four-way steering value and a compartment 66 contains a limit valve and valves for controlling fluid fluid pressure in the crank case chamber. The potentiometer in compartment 64 and the valves in compartment 66 are controlled by the position and location of shaft 57. In FIGURE 2, the neutral position of the crank arm 25 along the centerline 28 is designated as position A. The position of the crank shaft 25 for a maximum 75 degree turn to the right is shown by line B and the position for a maximum 75 degree turn to the left is shown by line C. The position of the crank shaft for a 5 degree turn to the right is shown by the line D and for a 5 degree turn to the left is shown by line E. In the use of the fluid motor of the present invention, it is possible to obtain substantially uniform torque on the crank shaft throughout the 150 degree steering range between positions B and C by controlling the pressure in the cylinder and in the crank case.

Figure 5:
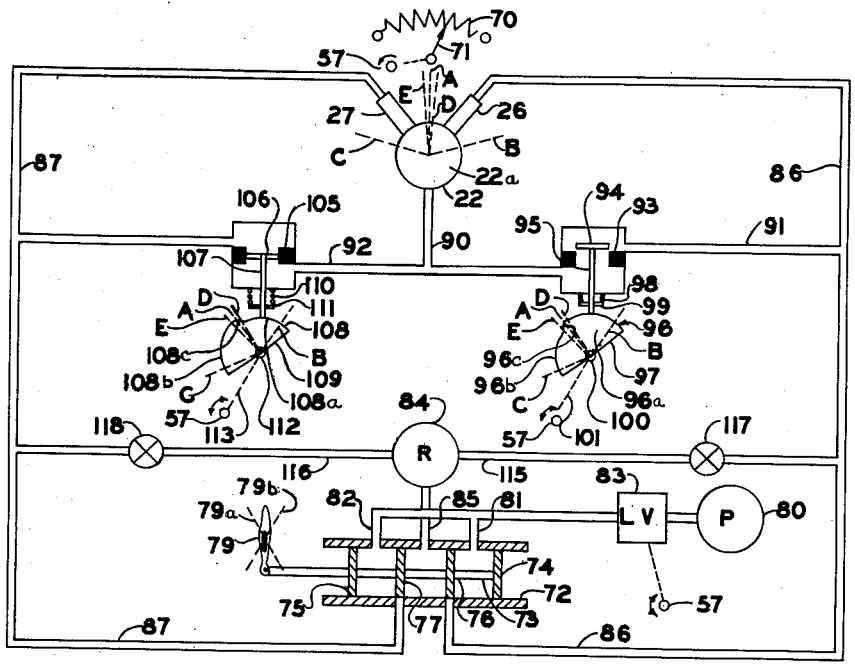
FIGURE 5 is a diagrammatic view of the hydraulic system for the fluid motor, showing the valves actuated by the crank shaft.

Referring to FIGURE 5, the potentiometer contained within compartment 64 comprises a winding 70 and a wiper 71 connected to the shaft 57 for rotation therewith. Thus, the potential picked off by the wiper 71 provides a continuous signal representing the actual positions of the nose wheel 16 and this signal can be utilized to actuate any suitable position indicator. The manually controlled four-way steering valve contained in the second compartment 65, comprises a valve casing 72 which slidably contains a valve stem 73, casing end lands 74 and 75 and central control lands 76 and 77. A manually operated lever 79 is pivotally connected to one end of stem 73 and the lever can be manually moved from the neutral, full line position to position 79a or 79b to cause the wheel 16 to turn clockwise and counterclockwise, respectively.

A pump 80 supplies fluid pressure to the valve casing 72 through a limit valve 83 and through passages 81 and 82 and the casing is connected to a fluid reservoir or receiver 84 by passage 85. The valve land 76 controls a fluid conduit 86 leading to the top of cylinder 26 and the land 77 controls a conduit 87 leading to the top of cylinder 27. The limit valve 83 is contained in the compartment 66 and is positioned by the shaft 57 in order to cut off the fluid pressure supply from the pump to the valve casing 72 when the wheel 16 reaches its limit of travel in either the clockwise or counterclockwise direction.

The interior space or chamber 22a of crank case 22 is connected by passages 90 and 91 to the conduit 86 and by passages 90 and 92 to the conduit 87. Passage 91 contains a valve sleeve 93 into which can move a valve 94 carried by a valve stem 95 and the end of the stem is held against a cam surface 96 on cam body 97 by a spring 98 acting between the passage 91 and a pin 99. The cam body 97 is rotated about its axis 100 by a link 101 connected with shaft 57. Portion 96a of the cam surface 96 between lines B and D is raised above the portion 96b between lines C and E, and the portion 96c between lines D and E connects the surface portions 96a and 96b. When the valve stem 95 is riding on cam surface portion 96a, the valve 94 is raised slightly above valve sleeve 93 to open the passage 91 and connect conduit 86 to interior 22a of the crank case 22. When the stem 95 reaches the cam portion 96c, the valve 94 will immediately enter the valve sleeve 93 to close passage 91 and will thereafter ride downwardly in the sleeve until cam surface portion 96b is reached. The valve 94 will remain in the downward position as long as the stem is on cam surface portion 96b in order to continually close passage 91. It is therefore apparent that when the cam surface portion 96a engages stem 95, the valve 94 will be in open position and when the stem engages surface portions 96c and 96b, the valve head 94 will be in closed position.

In a like manner, the passage 92 contains a valve sleeve 105 which receives a valve 106 carried by a valve stem 107. The end of the stem 107 is held against the cam surface 108 on a cam body 109 by means of a spring 110 acting between the passage 92 and pin 111. The cam body 109 is rotated about its axis 112 by a link 113 connected to shaft 57. The cam surface 108 has a portion 108a between lines B and D which is lower than the portion 108b located between lines C and E, and these two portions are connected by a portion 108c between lines D and E. When the stem 107 rides on portion 108a, the valve 106 is located within sleeve 105 and closes passage 92. The cam surface portion 108c raises the valve 106 so that when the stem 107 reaches the surface 108b, the valve moves out of the sleeve 105 to open the passage 92 and connect conduit 87 to the interior 22a of the crank case 22.

The cam bodies 97 and 109 and the valves 94 and 106 controlled thereby, along with the limit valve 83, are located in compartment 66 for connection with the shaft 57. It is understood that the cam bodies 97 and 109 are moved together by the shaft 57 and that the position lines A–E shown on the cam bodies represent the corresponding position for the shaft 57. Lines 115 and 116 connect conduits 86 and 87, respectively, to the reservoir passage 85 and these lines contain manually controlled valves 117 and 118, respectively, which are normally closed. When it is desired to have the nose wheel 16 free-wheel through 360°, the valves 117 and 118 are opened and the main control lever 79 is placed in the neutral position so that both the cylinders 26 and 27 and the interior chamber 22a of the crank case 22 are connected to the reservoir through lines 115 and 116.

In FIGURE 5, the cam bodies 97 and 109 are shown in positions corresponding to a nose wheel angle of approximately 30° to the right. If it is desired to move the nose wheel to the left, the manual control lever 79 is moved into position 79b so that fluid pressure is applied to cylinder 26 through conduit 86 and the cylinder 27 is connected to the receiver 84 through conduit 87 and the valve sleeve 72. Also, the crank case space or chamber 22a is connected to fluid pressure through valve 94 and the valve 106 is in closed position to prevent communication between conduits 86 and 87. When the nose wheel passes the position of 5° right corresponding to line D, the valve 94 will immediately close passage 91 and move into sleeve 93, while the valve 106 will move out of sleeve 105 and open passage 92 when the wheel reaches a 5° left position corresponding to line E. Thus, the valve 94 will close before valve 106 opens to prevent direct communication between conduits 86 and 87 and this action takes place over a small wheel angle through which there is only slight displacement of the pistons so that a vacuum in the crank case cannot result. As the nose wheel moves from the 5° left position of line E to the 75° left position of line C, the valve stems 95 and 107 will ride on cam surface portions 96b and 108b, respectively. In these positions, fluid pressure is applied to cylinder 26, and the cylinder 27 and the crank case space 22a are both connected to the receiver 84. When the wheel reaches the 75° left position, the limit valve 83 will cut off the fluid pressure supply from pump 80 so that no further movement to the left will result.

When it is desired to turn the nose wheel from the full left position of line C to the right, the main control lever 79 will then be moved into the position 79b which will cause fluid pressure to be applied to the cylinder 27 and to the crank case space 22a since the valve 106 is in the open position because stem 107 is on the cam surface 108b. The cylinder 26 will be connected to the receiver 84 through the valve sleeve 72 and the valve 94 will be in the closed position because stem 95 is a cam portion 96b. When the wheel reaches the 5° left position and passes through the position range between lines E and D, the valve 106 will first close and the valve 97 will then open. Between the 5° right position of line D and the 75° right position of line B, fluid pressure will be applied to cylinder 27, and the cylinder 26 and crank case space 22a will be connected to the receiver 84 through the valve casing 72. When the nose wheel reaches the 75° right position illustrated by line B, the limit valve 83 will again disconnect the pump 80 from the system to prevent further turning of the wheel to the right. Of course, the nose wheel can be maintained in a selected position by returning the main control lever to its neutral position to close 86 and 87.

It is therefore apparent that during a turn to the left commencing from a position at 75° to the right, fluid pressure will act on both sides of the piston in cylinder 26 and on the crank case side only of the piston in cylinder 27 so that cylinder 27 produces the driving force. After the crank shaft moves to the left past the position of line E, only fluid pressure on the upper surface of the piston in cylinder 26 will drive the crank shaft and nose wheel since both sides of the piston in the cylinder 27 are connected to the reservoir 84.

When the wheel moves from its 75° left position of line C towards the right, fluid pressure is applied to both sides of the piston in cylinder 27 and only to the under side of the piston in cylinder 26 so that cylinder 26 produces the driving force. However, after the wheel passes the 5° right position of line D, the pressure in the crank case is relieved so that the pressure on the upper side of the piston in cylinder 27 continues to drive the nose wheel to its maximum right position. Because of this action, the piston having the best torque arm with the crank shaft produces the driving force and the driving force shifts from one piston to the other as the crank shaft passes its neutral position corresponding to line A. Therefore, it is possible to obtain a relatively uniform torque throughout the large steering angle.

Figure 6:
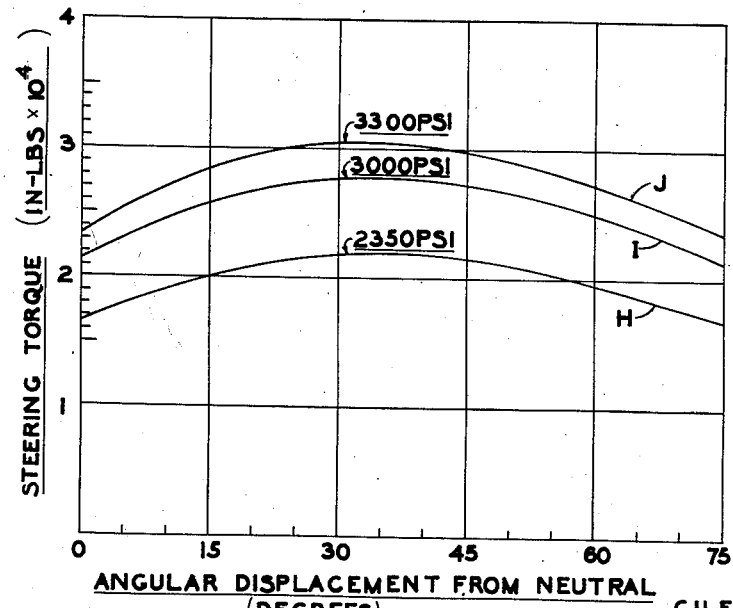
FIGURE 6 illustrates the steering torque available through an angle of 75 degrees from each side of neutral position of the crank shaft.

Referring to FIGURE 6, the curves H, I and J show the steering torque produced by fluid pressures of 2350, 3000 and 3300 p.s.i., respectively, over a 75° turning angle in either direction from the neutral, straight ahead position of the wheel 16. For each curve, the steering torque is approximately the same at the neutral position and at the maximum steering position, with a somewhat higher torque between these limits.

Because there is only a small variation in torque throughout the complete steering range, it is possible to design the fluid motor of the present invention for a torque output not greatly in excess of the steering torque at any position of the nose wheel. While the present invention has been described as actuating the nose wheel of an aircraft, it has general utility as a fluid motor for positioning or driving any selected instrument or component. It is understood that the angle between the cylinders can be varied slightly as long as a large average torque arm is available for each piston rod when its piston produces the driving force. Also, various valve and cylinder constructions can be utilized and the total angular movement of the crank shaft can be varied. Various other modifications are contemplated by those skilled in the art without departing from the spirit in scope of the invention is hereinafter defined by the appended claims.

What is claimed is:

1. A fluid motor comprising, a crank case having a chamber containing a crank shaft, first and second cylinders extending from said crank case at an angle with respect to each other, first and second pistons in said cylinders connected to said crank shaft by piston rods, separate fluid passages connected to the outer end of each of said cylinders for directing fluid to the upper side of said pistons; and a fluid passage connected to said crank case chamber for directing fluid to the undersides of both said pistons simultaneously, and valve means for controlling the flow of pressure fluid to the ends of said cylinders and to said crank case through said passages in such a manner that the undersides of said first and second pistons are simultaneously pressurized when one of said pistons is pressurized on its upperside and are simultaneously relieved of pressure when the other said piston is pressurized on its upper side.

2. A fluid motor as defined in claim 1 wherein said valve means comprises a pair of valves responsive to the position of said crank shaft for controlling the fluid flow to said crank case chamber.

3. A fluid motor as defined in claim 1 wherein said valve means comprises a manually positioned valve for controlling the fluid passages connected to the outer end of each of said cylinders.

4. A fluid motor as defined in claim 2 wherein each valve of said pair of valves is located in a line connecting between one of said separate fluid passages and the fluid passage to said crank case chamber, and cam means connected with said crank shaft for opening one of said pair of valves to balance the fluid pressure on one of said pistons also connected to fluid pressure by said manually positioned valve and produce a resultant pressure differential on the other of said pistons during movement of the crank shaft through a part of the total rotation angle and for opening the other of said pair of valves during the remaining portion of said rotation angle to drive said crank shaft by fluid pressure on said one piston.

5. A fluid motor as defined in claim 4 wherein said crank shaft is in neutral position when bisecting the angle between said cylinders, said cam means opening one of said pair of valves and closing the other of said pair of valves over a crank shaft angle range between a small angle on each side of the neutral position of said crank shaft.

6. A fluid motor comprising, a crank case having a chamber containing a crank shaft, first and second cylinders extending from said crank case at an angle with respect to each other and in a common plane perpendicular to the axis of said crank shaft, first and second pistons in said cylinders connected to said crank shaft at the same location by separate piston rods, the connecting end of one of said piston rods being split for receiving the connecting end of the other of said piston rods, said crank shaft extending through one side of said crank case for connection to a driven member, separate fluid passages connected to the outer end of each of said cylinders for directing fluid to the upper sides of said pistons; and a fluid passage connected to said crank case chamber for directing fluid to the undersides of both pistons simultaneously; valve means for controlling the flow of fluid pressure to the ends of said cylinders and to said crank case chamber through said passages, and cam means linked to said crank shaft and said valve means for actuating said valve means to control the flow of fluid to said crank case chamber in such a manner that the undersides of said first and second pistons are simultaneously pressurized when one of said pistons is pressurized on its upper side and are simultaneously relieved of pressure when the other piston is pressurized on its upper side.

7. A fluid motor comprising a crank case having a chamber containing a crank shaft, a plurality of cylinders extending from said crank case at an angle with respect to each other, a piston in each of said cylinders connected to said crank shaft by a piston rod, first and second fluid passages connected to the outer end of each of said cylinders and a third fluid passage connected to said crank case chamber for directing fluid to the under side of said pistons, first and second valves having one side of their seats connected to said first and second passages, respectively, the other side of the seats of said valves having common connection with each other and with said third fluid passage, and means for selectively seating one of said valves and unseating the other said valve to produce a substantially uniform torque on said crank shaft throughout a large angle of rotation.

8. The fluid motor of claim 7 wherein said means for selectively seating and unseating said valves comprises cam means linked to said crank shaft.

References Cited in the file of this patent

UNITED STATES PATENTS

| | | |
|---|---|---|
| 729,313 | Fenton | May 26, 1903 |
| 1,006,883 | Schofield | Oct. 24, 1911 |
| 1,989,212 | Pascolini | Jan. 29, 1935 |